UNITED STATES PATENT OFFICE.

CHARLES C. REED, OF PHILADELPHIA, PENNSYLVANIA, ASSIGNOR TO CHARLES C. REED, W. S. REINERT, AND J. SCHNELL.

IMPROVEMENT IN MANUFACTURING UMBRELLA-RIBS.

Specification forming part of Letters Patent No. 14,431, dated March 11, 1856.

*To all whom it may concern:*

Be it known that I, CHARLES C. REED, of the city of Philadelphia and State of Pennsylvania, have invented a new and Improved Mode of Manufacturing Ribs for Umbrellas; and I do hereby declare that the following is a full, clear, and exact description of the same.

My invention consists in the manufacture of umbrella-ribs by grooving a cheap material—such as hickory, bamboo, or rattan—and securing within the groove a strip of whalebone.

After the hickory, bamboo, or rattan has been cut into strips of the size required for the ribs of umbrellas by the machine for which a patent was granted to me and Wm. S. Reinert, dated October 2, 1855, or by any other suitable machine, a groove about one-eighth of an inch deep and about one-twentieth of an inch in width is cut the entire length of each strip, and into this groove is secured, by glue or other suitable cement, a strip of whalebone of the same dimensions as the said groove. By thus combining strips of any of the above-mentioned cheap materials with narrower strips of whalebone I am enabled to furnish ribs suitable for umbrellas at a much less cost than such as are made entirely of whalebone, the introduction of the whalebone strips rendering the ribs much more elastic than if made of hickory, bamboo, or rattan only.

What I claim, and desire to secure by Letters Patent, is—

The manufacture of umbrella-ribs by grooving a cheap material—such as hickory, bamboo, or rattan—and securing within the groove a strip of whalebone, substantially in the manner set forth.

CHAS. C. REED.

Witnesses:
F. W. BINDER,
MARTIN LUTZ.